(12) United States Patent
Joshi et al.

(10) Patent No.: US 12,287,902 B2
(45) Date of Patent: Apr. 29, 2025

(54) VAULTLESS TOKENIZATION

(71) Applicant: Capital One Services, LLC, McLean, VA (US)

(72) Inventors: Rohit Joshi, Glen Allen, VA (US); Hao Cheng, Oakton, VA (US); Michael James Caughey, Glen Allen, VA (US)

(73) Assignee: Capital One Services, LLC

( * ) Notice: Subject to any disclaimer, the term of this patent is extended or adjusted under 35 U.S.C. 154(b) by 165 days.

(21) Appl. No.: 17/901,575

(22) Filed: Sep. 1, 2022

(65) Prior Publication Data

US 2024/0078334 A1   Mar. 7, 2024

(51) Int. Cl.
| | |
|---|---|
| G06F 21/00 | (2013.01) |
| G06F 21/31 | (2013.01) |
| G06F 21/60 | (2013.01) |
| G06F 21/62 | (2013.01) |

(52) U.S. Cl.
CPC .......... G06F 21/6245 (2013.01); G06F 21/31 (2013.01); G06F 21/602 (2013.01)

(58) Field of Classification Search
CPC ..... G06F 21/6245; G06F 21/31; G06F 21/602
See application file for complete search history.

(56) References Cited

U.S. PATENT DOCUMENTS

| | | | |
|---|---|---|---|
| 9,779,220 B1 | 10/2017 | Kronrod et al. | |
| 10,885,222 B2 | 1/2021 | Mattsson | |
| 11,030,341 B2 | 6/2021 | LaFever et al. | |
| 11,163,907 B2 | 11/2021 | Rozenberg et al. | |
| 11,250,157 B2 | 2/2022 | Apsingekar et al. | |
| 2017/0061403 A1 | 3/2017 | Reisgies et al. | |
| 2018/0062832 A1 | 3/2018 | Hatcher | |
| 2019/0207754 A1* | 7/2019 | Iyer | H04L 9/0877 |
| 2020/0366656 A1* | 11/2020 | Barnett | H04L 67/02 |
| 2020/0374120 A1* | 11/2020 | Stanley | H04L 9/0643 |
| 2021/0144005 A1 | 5/2021 | Stanley et al. | |

OTHER PUBLICATIONS

International Search Report and Written Opinion directed to related application No. PCT/US2023/31876, mailed Dec. 20, 2023, 14 pages.

\* cited by examiner

*Primary Examiner* — Michael M Lee
(74) *Attorney, Agent, or Firm* — Sterne, Kessler, Goldstein & Fox P.L.L.C.

(57) ABSTRACT

Disclosed herein are system, method, and computer program product embodiments for vaultless tokenization. Alphanumeric values may be determined based on numeric values generated from a hash of numeric user information shuffled through a plurality of randomly generated alphanumeric tables. The numeric user information and the alphanumeric values may be used to generate a table index. Shuffled numeric user information may be generated based on the table index and a plurality of randomly generated numeric tables, and transformed to alphanumeric user information (e.g., via format-preserving encryption, additive cipher, etc.). Each character of the alphanumeric user information may be shuffled through a different alphanumeric table of the plurality of alphanumeric tables identified for the character based on the table index. Moreover, an alphanumeric token may be generated based on the shuffled characters of the alphanumeric user information.

17 Claims, 3 Drawing Sheets

VAULTLESS TOKENIZATION

BACKGROUND

Many services and platforms, such as banking-as-a-service (BaaS) platforms, software-as-a-service (SaaS) platforms, financial technology (FinTech) platforms, infrastructure-as-a-service (IaaS) platforms, and platform-as-a-service (PaaS) platforms, that support a wide variety of users and/or client devices, use tokenization as a means to secure sensitive user information. Conventional tokenization schemes used by such services and platforms utilize vault-based security techniques where sensitive user information is secured by mapping tokens to encrypted plain-text values representing the user information and storing the mappings in a database. As the number of users supported by such services and platforms increases, databases used for conventional vault-based security are unable to support the increased amounts of user data and high throughput requirements. Additionally, tokenization vaults are routinely subjected to cyberattacks and other nefarious activities that compromise sensitive user data. Encryption (e.g., format-preserving encryption (FPE), etc.) used to secure sensitive information stored in vaults can be reverse-engineered and/or decrypted as a result of brute force and other nefarious activities. Similarly, FPE-based vaultless tokenization schemes (e.g., FF2, FF3, etc.) can be reverse-engineered and/or decrypted as a result of brute force and other nefarious activities.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
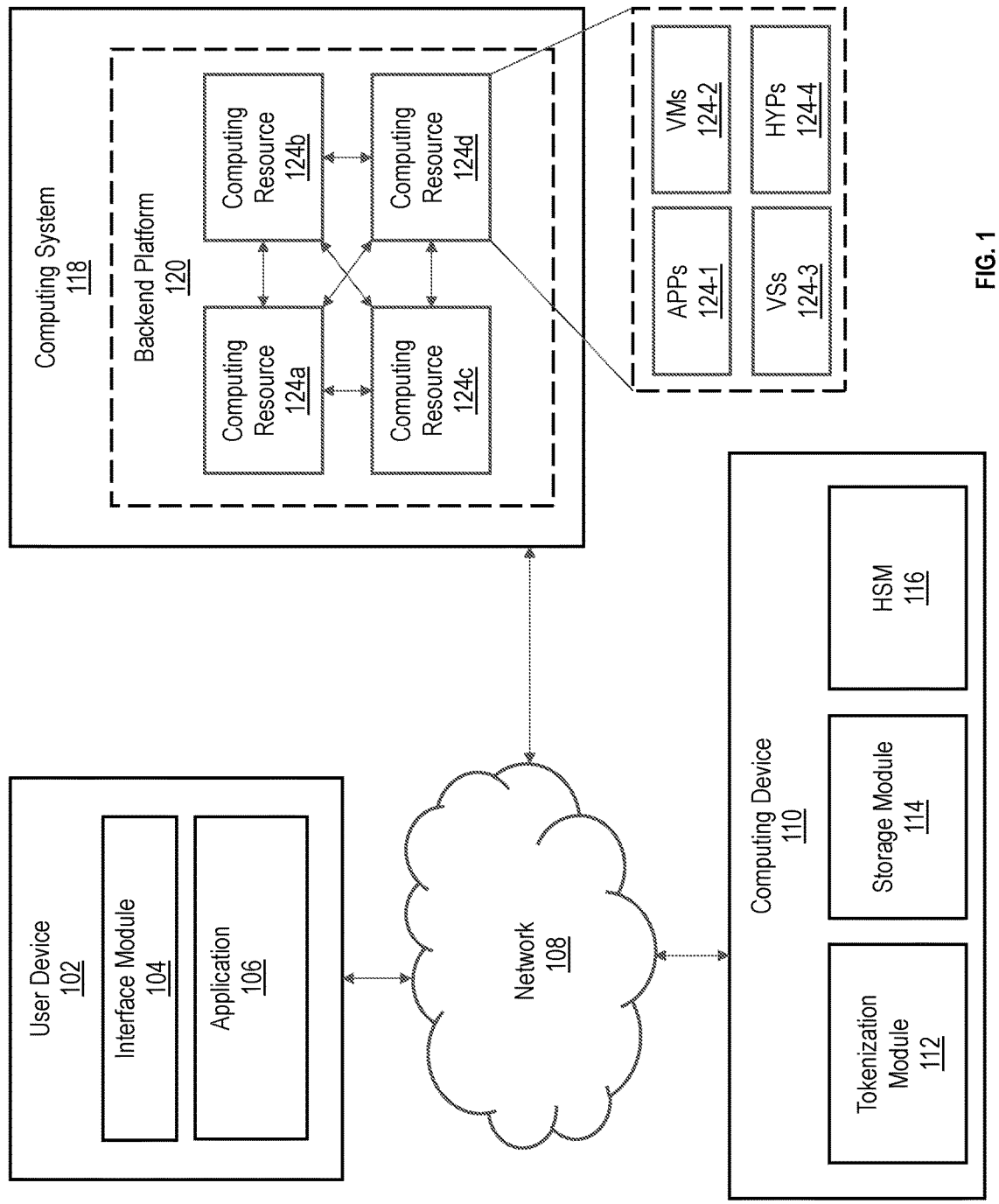
FIG. 1 is a block diagram of an example system for vaultless tokenization, in accordance with aspects of this disclosure.

A system and/or platform, such as a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like, may include, implement, and/or support vaultless tokenization to secure sensitive data/information. A secure alphanumeric token that cannot be reverse engineered with brute force may be generated and used to secure user information. A token output according to the system, apparatus, device, method, computer program product embodiments, and/or combinations and sub-combinations thereof, for vaultless tokenization described herein consists of completely random values (and/or characters, numbers, symbols, etc.) without any correlation to the sensitive data that is to tokenized. For example, random values of a token resulting from the system, apparatus, device, method, computer program product embodiments, and/or combinations and sub-combinations thereof, for vaultless tokenization described herein are determined from input values randomly shuffled through a plurality (e.g., $2^{62}$, etc.) of randomly generated tables (e.g., alphanumeric tables, alphabet tables, symbolic tables, numeric tables, etc.).

A computing device may determine alphanumeric values based on numeric values generated from a hash of numeric user information shuffled through a plurality of randomly generated alphanumeric tables. A table index may be generated based on at least a portion of the numeric user information and the alphanumeric values. Shuffled numeric user information may be generated based on the table index and a plurality of randomly generated numeric tables. The shuffled numeric user information may be transformed to alphanumeric user information, for example, based on format-preserving encryption applied to the shuffled numeric user information, additive cipher information applied to the shuffled numeric user information, and/or the like. Each character of the alphanumeric user information may be shuffled through a different alphanumeric table of the plurality of alphanumeric tables identified for the character based on the table index. Moreover, an alphanumeric token may be generated based on the shuffled characters of the alphanumeric user information.

According to some aspects, a secure alphanumeric token may be algorithmically generated so that when detokenization is required, the secure alphanumeric token may be used to determine original user information without utilizing a tokenization vault to look up and/or identify sensitive information. According to some aspects, the system, method, and computer program product embodiments for vaultless tokenization may generate the secure alphanumeric token using multiple rounds of shuffling and lookup (e.g., via a secure table index) through a plurality of randomly generated tables (e.g., 10M+ pre-generated tables, etc.) that are encrypted and securely stored via a hardware service module (HSM) and/or the like. This method of shuffling and lookup results in a unique token that cannot be reversed engineered. According to some aspects, user information that has been shuffled through the plurality of randomly generated tables may be further secured through the application of mathematical operations (e.g., XOR, division, modulo, etc.), string operations (e.g., reverse, split, rotation, etc.) and/or an encryption algorithm. According to some aspects, the encryption algorithm may include, but is not limited to, length-preserving encryption (e.g., HCTR2, Block Cipher, etc.), format-preservice encryption (e.g., FF1, etc.), homomorphic encryption (e.g. BFV, CKKS, FHEW, etc.), and/or the like, using a user-specific derived key. According to some aspects, user information may be shuffled before encryption and reshuffled post encryption to generate an alphanumeric token. According to some aspects, metadata associated with the user information including, but not limited to, metadata describing character length, version number, field type, cyclic redundancy check (CRC) information, and/or the like may also be shuffled through the plurality of randomly generated tables and used to modify the alphanumeric token for additional randomness, security, and/or character-set frequency distribution.

Accordingly, the system, apparatus, device, method, computer program product embodiments, and/or combinations and sub-combinations thereof, for vaultless tokenization described herein overcome challenges with conventional vault-based tokenization systems where sensitive user information is secured by mapping tokens to encrypted plain-text values representing the user information and storing the mappings in a database. The system, apparatus, device, method, computer program product embodiments, and/or combinations and sub-combinations thereof, for vaultless tokenization support scalability, such that as the number of users supported by vaultless tokenization as described herein increases, storage mediums (e.g., vaults) traditionally used to store sensitive information and/or key-value mappings to such sensitive information are not required. The system, apparatus, device, method, computer program product embodiments, and/or combinations and sub-combinations thereof, for vaultless tokenization, described herein output a token (e.g., a secure alphanumeric token, etc.) that may not be reverse engineered and/or decrypted through brute force and other nefarious activities.

The system, apparatus, device, method, computer program product embodiments, and/or combinations and sub-combinations thereof, for vaultless tokenization, described herein supports a continuous increase of user data and/or tokenization requests without data management and/or storage constraints associated with conventional tokenization systems. With conventional tokenization systems, to secure sensitive data/information, each tokenization request and/or transaction through the tokenization system must utilize certain functions provided by an HSM, and is therefore limited to the performance capacity of the HSM. Since no vault/HSM is used to store and/or generate tokens, and tokens are generated on demand based on requests for tokenization, the system, apparatus, device, method, computer program product embodiments, and/or combinations and sub-combinations thereof, for vaultless tokenization, described herein minimize the involvement of HSMs. For example, the involvement of HSMs at runtime (e.g., any time/period during which an application, program, and/or the like is operating/running, etc.) when processing tokenization requests is minimized, and therefore any performance bottleneck caused by an HSM and/or the like is alleviated. These and other advantages are described herein.

FIG. 1 is a block diagram of an example system 100 for vaultless tokenization, according to some aspects of this disclosure. According to some aspects of this disclosure, system 100 may include and/or be a component of a business platform, a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like.

According to some aspects, system 100 may include a user device 102 (e.g., a mobile device, a smart device, a client device, a computer, an Internet-of-Things (IoT) device, a content access/reception device, etc.), a computing device 110 (e.g., a server, a cloud-computing device, a token management device, etc.), and a computing system 118 (e.g., a cloud-based computing system, a service system, a token management system, etc.) in communication via a network 108. Devices of and/or components of system 100 may be connected and/or in communication via wired connections, wireless connections, combinations thereof, and/or the like. According to some aspects, the computing device 110 may reside fully or partially on the computing system 118.

According to some aspects, the network 108 may include a packet-switched network (e.g., internet protocol-based network), a non-packet switched network (e.g., quadrature amplitude modulation-based network), and/or the like. The network 108 may include network adapters, switches, routers, modems, and the like connected through wireless links (e.g., radiofrequency, satellite) and/or physical links (e.g., fiber optic cable, coaxial cable, Ethernet cable, or a combination thereof). The network 108 may include public networks, private networks, wide area networks (e.g., Internet), local area networks, and/or the like. The network 108 may include a content access network, content distribution network, and/or the like. The network 108 may provide and/or support communication from telephone, cellular, modem, and/or other electronic devices to and throughout the system 100.

According to some aspects, the user device 102 may include an interface module 104. According to some aspects, the interface module 104 enables a user to interact with the user device 102, the network 108, the computing device 110, the computing system 118, and/or any other device/component of the system 100. The interface module 104 may include any interface for presenting and/or receiving information to/from a user. According to some aspects, the interface module 104 may include a web browser, a user interface, and/or the like.

According to some aspects, the interface module 104 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate data/information.

According to some aspects, user device 102 may include and/or be configured with application 106. Application 106 may include one or more application programming interfaces (APIs) that enable the user device 102 to access, view, communicate, and/or the like with devices/components of the system 100. For example, according to some aspects, the application 106 may support, facilitate, and/or be used as part of online transactions where a secure token (e.g., a secure alphanumeric token, etc.) may be generated to ensure the security of the online transactions. For example, online transactions may include the exchange of sensitive information (e.g., virtual card numbers generated in place of actual card numbers of a physical credit card, digital wallet information, user identification information, transaction-related information, and/or the like.

According to some aspects, the computing system 118 may be a cloud-based computing system and/or the like. The computing system 118 may support a variety of applications, devices, and/or services including, but not limited to banking-as-a-service (BaaS), software-as-a-service (SaaS), financial technology (FinTech) services, infrastructure-as-a-service (IaaS), platform-as-a-service (PaaS), and/or the like. The computing system 118 may include and/or be supported by a backend platform 120.

According to some aspects, the backend platform 120 may include a server or a group of servers. According to some aspects, the backend platform 120 may be hosted in a computing system 118. It may be appreciated that the backend platform 120 may not be cloud-based, or may be partially cloud-based. The computing device 110 may include one or more devices and/or components configured to interface with the backend platform 120.

According to some aspects, the computing system 118 may include an environment that delivers computing as a service, whereby shared resources, services, etc. may be provided to the backend platform 120. The computing system 118 may provide computation, software, data access, storage, and/or other services that do not require end-user knowledge of a physical location and configuration of a system and/or a device that delivers the services. According to some aspects, the computing system 118 may include computer resources 124a-d.

According to some aspects, each computing resource 124a-d may include one or more personal computers, workstations, computers, server devices, or other types of computation and/or communication devices. The computing resource(s) 124a-d may host the backend platform 120. The cloud resources may include compute instances executing in the computing resources 124a-d. The computing resources 124a-d may communicate with other computing resources 124a-d by wired connections, wireless connections, or a combination of wired or wireless connections.

Computing resources 124a-d may include a group of cloud resources, such as one or more applications ("APPs") 124-1, one or more virtual machines ("VMs") 124-2, virtualized storage ("VS") 124-3, and one or more hypervisors ("HYPs") 124-4.

Application 124-1 may include one or more software applications (e.g., an instance of application 106, etc.) that may be provided to or accessed by the computing device 110 and/or the user device 102. Alternatively, the application 124-1 may eliminate the need to install and execute software applications on the user device 102. The application 124-1 may include software associated with backend platform 120 and/or any other software configured to be provided across the system 100. The application 124-1 may send/receive information from one or more other applications 124-1, by the virtual machine 124-2.

Virtual machine 124-2 may include a software implementation of a machine (e.g., a computer) that executes programs like a physical machine. Virtual machine 124-2 may be either a system virtual machine or a process virtual machine, depending upon the use and degree of correspondence to any real machine by virtual machine 124-2. A system virtual machine may provide a complete system platform that supports the execution of a complete operating system (OS). A process virtual machine may execute a single program and may support a single process. The virtual machine 124-2 may execute on behalf of a user and/or on behalf of one or more other backend platforms 225 and may manage the infrastructure of computing system 118, such as data management, synchronization, or long-duration data transfers.

Virtualized storage 124-3 may include one or more storage systems and/or one or more devices that use virtualization techniques within the storage systems or devices of computing resource 124a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 124-4 may provide hardware virtualization techniques that allow multiple operations systems (e.g., "guest operating systems") to execute concurrently on a host computer, such as computing resource 124a-d. Hypervisor 124-4 may present a virtual operating platform to the guest operating systems and may manage the execution of the guest operating systems in multiple instances of a variety of operating systems and may share virtualized hardware resources.

According to some aspects, computing device 110 may support and/or facilitate the secure exchange of sensitive data/information between devices and/or components of the system 100. According to some aspects, computing device 110 may support and/or facilitate the secure exchange of sensitive data/information between devices and/or components of the system 100 by generating and processing tokens associated with sensitive information.

According to some aspects, computing device 110 may include a tokenization module 112. According to some aspects, the tokenization module 112 may provide, support, and/or facilitate vaultless tokenization services (e.g., tokenizing and detokenizing data, etc.) to securely communicate sensitive information to the computing system 118 and/or the like. Tokenization involves the substitution of sensitive information such as social security numbers, account numbers, and/or the like with a cryptographically generated replacement value or a token. According to some aspects, a request for tokenization may be included with a request from a device and/or application attempting to secure sensitive information, access a secure resource, and/or the like. According to some aspects, a tokenization request may include user objects such as user data/information (e.g., sensitive data) to be tokenized. According to some aspects, user data/information may include a username/password associated with a user account, a social security number, financial information, banking account information, authentication information to be used for verifying the identity of the user, and/or the like. According to some aspects, a token may enable access to the resource, for example, for a defined amount of time (e.g., during a communication session, etc.).

According to some aspects, the tokenization module 112 may authenticate and/or authorize any tokenization requests received (e.g., received via a web service, RESTful service, secure hypertext transfer protocol (HTTPS) uniform resource locator (URL) over transport layer security (TLS) protocol, etc.) from the user device 102 and/or the computing system 118.

According to some aspects, computing device 110 may generate secure tokens, for example, responsive to a tokenization request, that may be used to access electronically restricted resources (e.g., computing resources 124a-d, etc.) and/or access/enable resources, functions, and actions within specific applications and/or domains of the system 100. For example, according to some aspects, each computing resource 124a-d may be associated with a different domain of a multi-domain application. For example, computing resource 124a may be associated with an electronic banking domain, computing resource 124b may be associated with a digital wallet and/or card management domain, computing resource 124c may be associated with a financial technology-related domain, computing resource 124c may be associated with a social networking domain, and/or the like. According to some aspects, each domain (e.g., computing resource 124a-d, etc.) may be associated with a single sign-on (SSO) and/or a single logout (SLO) application/platform and a different secure token may be used to access the different domains. For example, the tokenization module 112 may generate tokens specified for a domain and/or security/token level. An indicated domain for a token may be a domain of a multi-domain application and/or the like to which a secure token is used to enable access. The security/token level may be an indication of resources, functions, and actions available to the user device 102 within a domain, for a computing resource, and/or backend platform component for which a secure token is prepared.

According to some aspects, computing device 110 may include storage module 114. Storage module 114 may include physical storage, virtual storage, local storage, and/or remote storage mediums. According to some aspects, storage module 114 may store user objects associated with users (e.g., a user of the user device 102, etc.) such as sensitive data (e.g., credit card numbers, account numbers, personal information). According to some aspects, the storage module 114 may store user objects in a hashed form, an encrypted form, and/or an encrypted hashed form.

According to some aspects, storage module 114 may store data/information used for vaultless tokenization. According to some aspects, storage module 114 may store data/information used to generate secure tokens including, but not limited to, a plurality of randomly generated tables (e.g., alphabetic tables, numeric tables, alphanumeric tables, etc.). According to some aspects, storage module 114 may store key-value pairs and/or related information (e.g., various data structures, hashes, access control lists, data sets, token definitions, etc.).

According to some aspects, computing device 110 may include and/or be in communication with a hardware security module (HSM) 116. According to some aspects, HSM 114 may generate, store, and/or provide encryption keys (and/or secrets, hash keys, etc.) to the computing device 110. According to some aspects, may store any additional data/information (e.g., starting variables used for token generation, token parameters, secret keys, etc.) used by the tokenization module 112 for vaultless tokenization. For example, the HSM 116 may store generate, store, and/or provide indications of unique keys, hashing algorithms, salt values, iteration counts, token layouts, a token types (e.g., alphanumeric, numeric, alphabetic, string, etc.), replacement values, padding values, token scopes, format, and/or the like. According to some aspects, computing device 110 may communicate with the HSM 116 as a dedicated module and/or partition for vaultless tokenization and/or encryption services. According to some aspects, computing device 110 may communicate with the HSM 116 to access, retrieve, and/or receive encryption keys and/or any other data/information needed for tokenization and/or encryption at runtime.

According to some aspects, computing device 110 (e.g., tokenization module 112) may initiate a vaultless tokenization process by generating a plurality of random tables (e.g., 10M+ alphanumeric tables, alphabetic tables, numeric tables, symbolic tables, etc.). According to some aspects, an increased amount of plurality of random tables used for vaultless tokenization as described herein increases the randomness of an output token such that a nefarious actor attempting to decipher and/or reverse engineer the token generated will be unable to discern which characters, values, symbols, numbers, and/or the like of the token represent the original data/information and which characters, values, symbols, numbers, and/or the like.

According to some aspects, computing device 110 may generate various types of tables such as numeric tables with values ranging from 0-9, alphabetic tables including both lowercase and uppercase alphabetic characters, alphanumeric tables that combine numeric values with both lowercase and uppercase alphabetic characters, and/or tables that include other characters such as special/non-ASCII characters. According to some aspects, a plurality of randomly generated tables may be stored. For example, the plurality of randomly generated tables may be serialized into an encrypted file stored by the storage module 114. For example, a file containing a serialized plurality of randomly generated tables may be encrypted using a file encryption key that may be decrypted using Key-Encryption-Key (KEK) and/or the like from the HSM 116.

According to some aspects, the plurality of randomly generated tables may be later used to map and shuffle portions (e.g., characters, numbers, symbols, etc.) of information (e.g., sensitive information/data, numeric user information, etc.). For example, each table of the plurality of randomly generated tables may include a specific number of characters to map information (e.g., sensitive information/data, numeric user information, etc.) based on how the information is portioned and/or segmented. According to some aspects, additional metadata (e.g., metadata indicative of and/or describing user data/information length, version number, field type, CRC, etc.) may be shuffled through the plurality of randomly generated tables and used to further secure any generated token via data padding, appending, prepending, token modification, and/or the like. For example, the shuffled additional metadata may be added to portions of a generated token. A nefarious actor attempting to decipher and/or reverse engineer a token generated as described herein will be unable to discern which characters, values, symbols, numbers, and/or the like of the token represent the original data/information and which characters, values, symbols, numbers, and/or the like have been added to the cryptographic form of the original data/information via data padding, appending, prepending, token modification, and/or the like.

According to some aspects, the tokenization module 112 may generate encryption keys that may be used when generating random tables and/or facilitating related processes. According to some aspects, an encryption key may be generated for each user device (e.g., the user device 102, etc.) of the system 100, for example, during a user/client onboarding process and/or the like. For example, system 100 may include any number of user devices, and each user device (e.g., the user device 102, etc.) may be associated with an identifier (e.g., a customer identifier, a user identifier, a device identifier, etc.). The tokenization module 112 may generate a data encryption key, a hash function key (e.g., HMAC/hash key, etc.) to generate a CRC, and an initialization vector (IV) (e.g., a starting variable (SV), etc.) based on an identifier of a user device and encrypt such using KEK. According to some aspects, the tokenization module 112 may use any encryption technique.

According to some aspects, computing device 110 may generate any type of table to be used for vaultless tokenization as described herein. According to some aspects, computing device 110 may generate tables with 10M+ rows, where each row includes crypto randomly shuffled character sets in a pair to enable vaultless tokenization and/or detokenization. According to some aspects, computing device 110 may utilize a large set of randomly generated tables for increased randomness in token generation—thus preventing reverse engineering efforts.

According to some aspects, computing device 110 may generate a table index from one or more pre-configured secrets (e.g., secret information, passwords, credentials, secret key, etc.), input value characters (numbers, characters, symbols, etc.), and match operations (e.g., HMAC, etc.). The table index may be used to identify an initial table of a plurality of tables to use when shuffling different input value characters through different tables of the plurality of tables to generate a token. According to some aspects, the computing device 110 may also generate increment values from one or more pre-configured secrets, the input value characters (numbers, characters, symbols, etc.), and match operations (e.g., HMAC, etc.). The increment value may be used to determine the next table to select, after the initial table, and shuffle the next value of input value characters after the initial table of the plurality of tables is used to shuffle the initial value of the input values. According to some aspects, the increment value may be used to determine a table index for each character in the input value which results in a different table being selected for each character. According to some aspects, to increase the randomness of generated token values, input value characters may be shuffled according to a randomly determined amount of rounds (an indication of which may be stored in the HSM 116) and used to generate a different table index to be used for a next input value character determined after each input value character shuffling round. According to some aspects, computing device 110 may use any shuffling scheme to shuffle input value characters according to the system, apparatus, device, method, computer program product embodiments, and/or combinations and sub-combinations thereof, for vaultless tokenization described herein.

According to some aspects, in a scenario where a nefarious actor gets access to encrypted random tables generated by the computing device 110, the nefarious actor would still be unable to reverse engineer any token generated according to the system, apparatus, device, method, computer program product embodiments, and/or combinations and sub-combinations thereof, for vaultless tokenization described herein. For example, the nefarious actor would lack the necessary encryption keys, hashing keys, and other secret values stored by the HSM 116. Additionally, the nefarious actor would be unaware of the logic to derive any runtime values from the encryption keys, hashing keys, and other secret values stored by the HSM 116 and replicate the exact algorithm/shuffling of the plurality of random tables used by computing device 110.

According to some aspects, computing device 110 may generate a token based on a vaultless tokenization process. According to some aspects, a process for token generation described below may be used for generating a secure token that may not be reverse engineered, for example, via brute force and/or the like. According to some aspects, the process for token generation is provided as an example. The system, apparatus, device, method, and/or computer program product embodiments, and/or combinations and sub-combinations thereof for vaultless tokenization are not limited to this process of token generation and other steps may be used in accordance with aspects described herein.

Token Generation

Steps:
1. Validate input data/information (e.g., numeric user information, etc.) via a checksum formula to distinguish valid numbers, characters, symbols, etc. from mistyped/incorrect numbers, characters, symbols, etc.
   For example:
      Input value=0123456789
2. Calculate a numeric and alphanumeric checksum. An alphanumeric checksum is shuffled through randomly generated tables.
   For example:
      a. Calculate CRC7 of input value length to output numeric checksum=19
      b. Convert numeric checksum into base62=J
      c. Shuffle converted numeric checksum using a randomly generated alphanumeric table to output alphanumeric checksum=4
3. Generate a table index (table lookup index) from the numeric checksum. To increase security, optionally generate the table index from one or more pre-configured secrets, characters (numbers, characters, symbols, etc.) from input value, and/or match operations.
4. Shuffle data/information using randomly generated tables (e.g., shuffle characters of numeric user information through randomly generated numeric tables, etc.). Shuffle each number, character, symbol, etc. of input data/information from a different table. Use the table index to identify which table to use.
   For example:
      Shuffled input value=6516589042
5. Perform one or more operations (e.g., Format-preserving Feistel-based Encryption Mode (FF1), XOR, reverse, split, shuffled index, etc.) at runtime (e.g., at the start of an application/system requesting and/or requiring the use of a token, etc.) to change values of the input data/information. According to some aspects, selectively perform one or more operations at runtime to change values of the input data/information, for example, based on a pre-configuration, system setting, and/or preference (e.g., security preference of a tokenization entity and/or service, etc.). According to some aspects, randomly perform one or more operations at runtime to change values of the input data/information. Perform one or more operations at runtime in different orders with multiple rounds.
   For example:
      One or more operations (e.g., Format-preserving Feistel-based Encryption Mode (FF1), XOR, reverse, split, shuffled index, etc.) applied to input value=2691294559
6. Transform the changed values of the input data/information. For example, convert any numeric value to an alphanumeric (e.g., according to base52, base62, base64, etc.).
   For example:
      Transformation of format-preserving encryption (FPE) value u128 to Base62=2w8Oel
7. Generate token values by shuffling values of the transformed input data/information through random tables (e.g., alphanumeric tables, etc.) with multiple rounds. Shuffle each number, character, symbol, etc. of the transformed input data/information from a different table. Use the table index to identify which table to use.
   For example:
      Shuffle value from step 6 (e.g., 2w8Oel) using randomly generated alphanumeric table=oXZslN
8. Output token value.
   For example:
      Alphanumeric token=oXZslN According to some aspects, computing device 110 may modify any token (e.g., a token output from a process of token generation, etc.) generated as described herein for additional security based on a vaultless tokenization algorithm. According to some aspects, a process for token modification below may be used to modify any token generated as described herein for additional security. A token that is modified according to the process for token modification may not be reverse engineered, for example, via brute force and/or the like. According to some aspects, the process for token modification is provided as an example. The system, apparatus, device, method, and/or computer program product embodiments, and/or combinations and sub-combinations thereof for vaultless tokenization are not limited to the process for token modification and other steps may be used in accordance with aspects described herein.

Token Modification

Steps:
1. Determine if the length of input data/information should be included in a generated token (the output of the process of token generation, etc.). (If yes, shuffle the length through a randomly generated table. Use the table index from the process of token generation to identify which table to use).
   For example:
   a. Calculate length of input value (0123456789)=10
   b. Convert to an alphabet using lookup according to table index=k
   c. Shuffle length (10) using randomly generated alphabetic tables=o
2. Modify token (e.g., oXZslN) to include value determined from step 1.
   For example:
   Modified alphanumeric token=ooXZslN
3. For additional security, modify the token (e.g., oXZslN) length further to match the length of the input value. For example, if the token length is lower than the expected output length, generate random numeric checksum into base62 (e.g., J). Derive from the table index where the random numeric is to be inserted in the token. Optionally, derive from the table index where a prefix of checksum characters is to be inserted in the token.
   For example:
   Modified alphanumeric token with prepended random numeric checksum=JooXZslN4

According to some aspects, computing device 110 (tokenization module 112) may detokenize the tokenized user data/information to determine, identify, and/or access the original user data/information. According to some aspects, the tokenization module 12 may use the plurality of randomly generated tables (and in some instances, encryption keys from HSM 116), in the reverse of the token generation and modification processes to detokenize any generated token.

Figure 2:
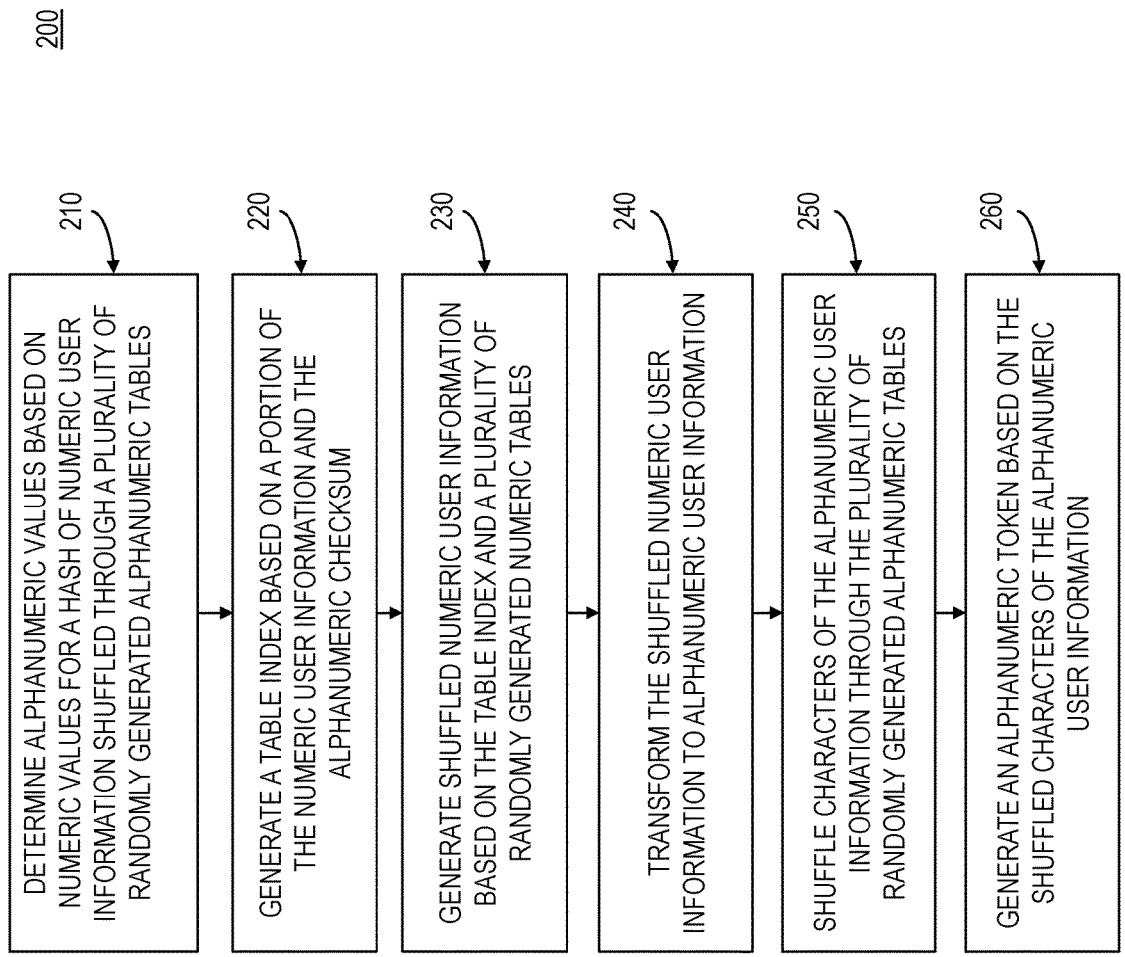
FIG. 2 shows an example method for vaultless tokenization, in accordance with aspects of this disclosure.

FIG. 2 shows an example computer-implemented method 200 for vaultless tokenization, according to some aspects of this disclosure. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 2, as will be understood by a person of ordinary skill in the art. Method 200 shall be described with regard to elements of FIG. 1. However, method 200 is not limited to the specific aspects depicted in FIG. 1 and other systems can be used to perform the method as will be understood by those skilled in the art.

In 210, a computing device 110 determines alphanumeric values. According to some aspects, computing device 110 may determine the alphanumeric values responsive to a request for tokenization (e.g., to generate a token, etc.). Tokenization involves the substitution of sensitive information such as social security numbers, account numbers, and/or the like with a cryptographically generated replacement value or a token.

According to some aspects, a request for tokenization may be included with a request from a device and/or application attempting to secure sensitive information, access a secure resource, and/or the like. According to some aspects, a token may enable access to the resource, for example, for a defined amount of time. Determining the alphanumeric values may be performed at the start of a tokenization process.

According to some aspects, computing device 110 may determine the alphanumeric values based on numeric values generated from a hash of numeric user information shuffled through a plurality of randomly generated alphanumeric tables. For example, during a vaultless tokenization initialization process and/or the like, computing device 110 may generate and/or store a plurality of randomly generated tables that include the plurality of randomly generated alphanumeric tables, a plurality of randomly generated numeric tables, and/or the like. According to some aspects, the numeric user information (with or without a pre-configured secret cryptographic key) may be hashed according to a hashing function to output hashed numeric information. According to some aspects, the hashed numeric user information may be encrypted to output the numeric values. For example, according to some aspects, additive cipher applications and/or information may be used to modify the hashed values of the numeric user information, and the modified hashed values may be shuffled through the plurality of randomly generated alphanumeric tables to output the numeric values and/or the like.

In 220, computing device 110 generates a table index. According to some aspects, computing device 110 may generate a table index (e.g., a reverse lookup table, etc.) based on at least a portion of the numeric user information and the alphanumeric values. According to some aspects, the table index may be encrypted and stored based on an encryption key (e.g., a user-specific encryption key, etc.) through an HSM (e.g., HSM 116, etc.) and/or the like. The table index may be accessed and/or used on occasion, such as during the generation of a token and/or the like.

In 230, computing device 110 generates shuffled numeric user information. According to some aspects, computing device 110 may generate the shuffled numeric user information based on the table index and the plurality of randomly generated numeric tables For example, computing device 110 may generate the shuffled numeric user information by shuffling the numeric user information through the plurality of randomly generated numeric tables. According to some aspects, each numeric character of the numeric user information may be shuffled through a different numeric table of the plurality of randomly generated numeric tables identified for the character based on the table index.

In 240, computing device 110 transforms the shuffled numeric user information to alphanumeric user information. According to some aspects, computing device 110 may transform the shuffled numeric user information to alphanumeric user information based on format-preserving encryption applied to the shuffled numeric user information, additive cipher information applied to the shuffled numeric user information, and/or the like.

In 250, computing device 110 shuffles each character of the alphanumeric user information through a different alphanumeric table of the plurality of randomly generated alphanumeric tables. According to some aspects of this disclosure, each different alphanumeric table may be identified for each character based on the table index.

In 260, computing device 110 generates an alphanumeric token. According to some aspects, computing device 110 may generate the alphanumeric token based on the shuffled characters of the alphanumeric user information.

According to some aspects of this disclosure, the method 200 may further include computing device 110 padding the alphanumeric token with a randomly generated numeric character. According to some aspects, computing device 110 may pad the alphanumeric token with a randomly generated numeric character based on an indication that a numeric character of the numeric user information is removed according to the numeric user information being shuffled through the plurality of randomly generated numeric tables.

According to some aspects of this disclosure, the method 200 may further include computing device 110 padding the alphanumeric token with the alphanumeric values.

According to some aspects of this disclosure, the method 200 may further include computing device 110 determining a numeric value indicative of an amount of numeric characters of the numeric user information. According to some aspects, computing device 110 may determine an alphabetic value indicative of the amount of numeric characters of the numeric user information based on an alphabetic representation of the numeric value being shuffled through a plurality of randomly generated alphabetic tables. According to some aspects, computing device 110 may append the alphabetic value to the alphanumeric token.

According to some aspects of this disclosure, the method 200 may further include computing device 110 sending the alphanumeric token to a user device associated with the numeric user information, a storage medium, an application, and/or the like to facilitate access to a resource and/or the like.

Figure 3:
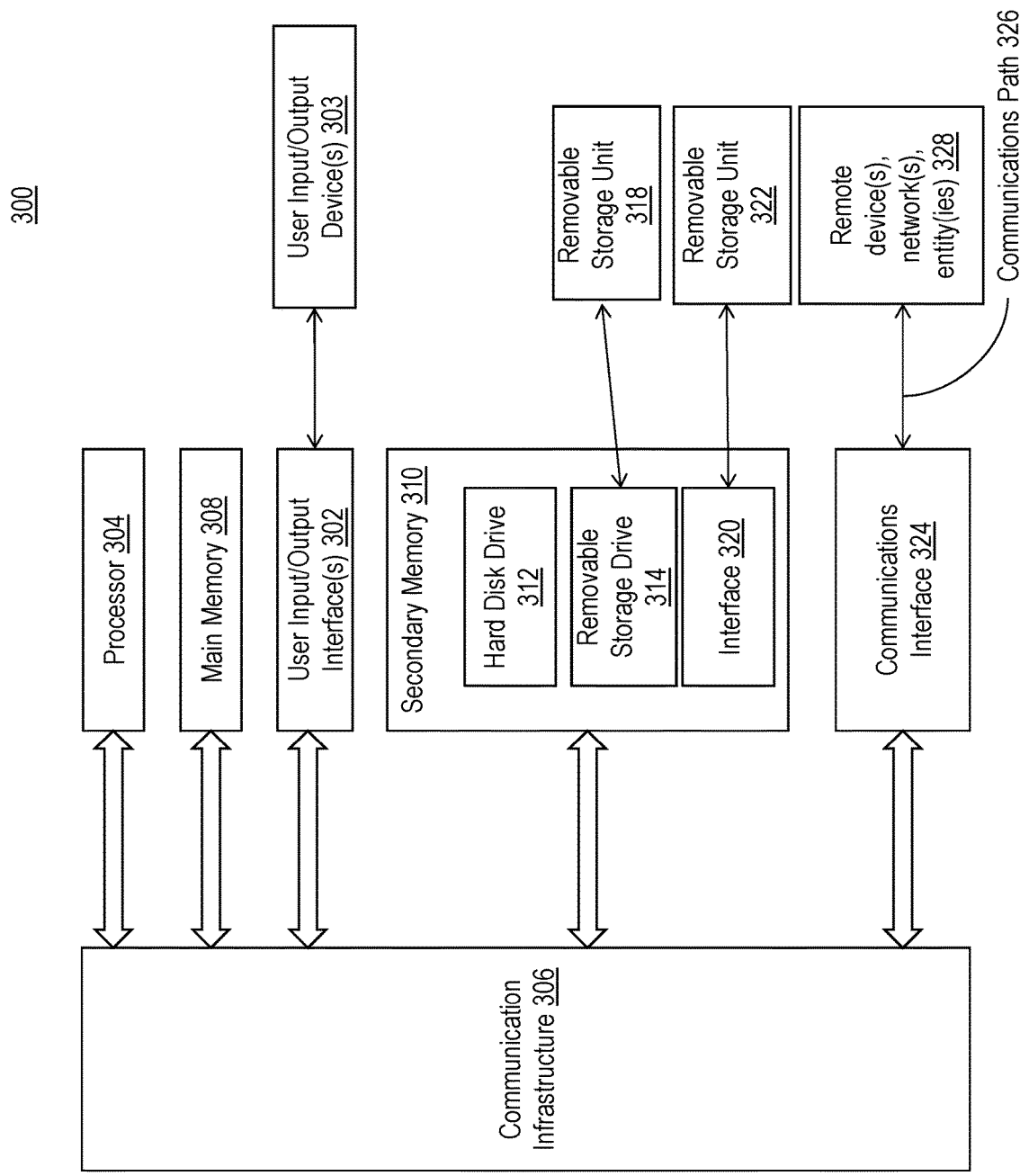
FIG. 3 is an example computer system useful for implementing various aspects disclosed herein.

Various aspects of this disclosure can be implemented, for example, using one or more computer systems, such as computer system 300 shown in FIG. 3. Any device and/or component described herein may be and/or include the computing system 300. Computer system 300 can be used, for example, to implement any method (e.g., the method 200, etc.) described herein. Computer system 300 can be any computer capable of performing the functions described herein.

Computer system 300 can be any well-known computer capable of performing the functions described herein.

Computer system 300 includes one or more processors (also called central processing units, or CPUs), such as a processor 304. Processor 304 is connected to a communication infrastructure 306 (a bus, etc.).

One or more processors 304 can each be a graphics processing unit (GPU). According to some aspects, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (e.g., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 can include other means, instrumentalities, or other approaches for allowing computer programs and/or other instructions and/or data to be accessed by computer system 300. Such means, instrumentalities, or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

According to some aspects, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method comprising:
    determining alphanumeric values based on numeric values that are generated from a hash of numeric user information then shuffled through a plurality of randomly generated alphanumeric tables;
    generating a table index based on at least a portion of the numeric user information and the alphanumeric values;
    generating shuffled numeric user information based on the table index and a plurality of randomly generated numeric tables;
    transforming the shuffled numeric user information to alphanumeric user information based on additive cipher information applied to the shuffled numeric user information;
    shuffling each character of the alphanumeric user information through a different alphanumeric table of the plurality of randomly generated alphanumeric tables, wherein each different alphanumeric table is identified for each character based on the table index; and
    generating an alphanumeric token based on the shuffled characters of the alphanumeric user information;
    determining a numeric value indicative of an amount of numeric characters of the numeric user information; and
    modifying the generated alphanumeric token to include an alphabetic value, wherein the alphabetic value is determined based on an alphabetic representation of the numeric value that is shuffled through a plurality of randomly generated alphabetic tables.

2. The computer-implemented method of claim 1, further comprising padding the alphanumeric token with a randomly generated numeric character based on an indication that a numeric character of the numeric user information is removed according to the numeric user information being shuffled through the plurality of randomly generated numeric tables.

3. The computer-implemented method of claim 1, further comprising padding the alphanumeric token with the alphanumeric values.

4. The computer-implemented method of claim 1, further comprising:
    hashing the numeric user information and a secret key to output the hashed numeric user information; and
    encrypting the hashed numeric user information to output the numeric values.

5. The computer-implemented method of claim 1, wherein the generating the shuffled numeric user information comprises shuffling the numeric user information through the plurality of randomly generated numeric tables, wherein each numeric character of the numeric user information is shuffled through a different numeric table of the plurality of randomly generated numeric tables identified for the numeric character based on the table index.

6. The computer-implemented method of claim 1, further comprising sending the alphanumeric token to at least one of a user device associated with the numeric user information, a storage medium, or an application to facilitate access to a resource.

7. A non-transitory computer-readable medium having instructions stored thereon that, when executed by at least one computing device, cause the at least one computing device to perform operations comprising:
    determining alphanumeric values based on numeric values that are generated from a hash of numeric user information then shuffled through a plurality of randomly generated alphanumeric tables;
    generating a table index based on at least a portion of the numeric user information and the alphanumeric values;
    generating shuffled numeric user information based on the table index and a plurality of randomly generated numeric tables;
    transforming the shuffled numeric user information to alphanumeric user information based on additive cipher information being applied to the shuffled numeric user information;
    shuffling each character of the alphanumeric user information through a different alphanumeric table of the plurality of randomly generated alphanumeric tables, wherein each different alphanumeric table is identified for each character based on the table index;
    generating an alphanumeric token based on the shuffled characters of the alphanumeric user information;
    determining a numeric value indicative of an amount of numeric characters of the numeric user information; and
    modifying the generated alphanumeric token to include an alphabetic value, wherein the alphabetic value is determined based on an alphabetic representation of the numeric value that is shuffled through a plurality of randomly generated alphabetic tables.

8. The non-transitory computer-readable medium of claim 7, the operations further comprising padding the alphanumeric token with a randomly generated numeric character based on an indication that a numeric character of the numeric user information is removed according to the numeric user information being shuffled through the plurality of randomly generated numeric tables.

9. The non-transitory computer-readable medium of claim 7, the operations further comprising padding the alphanumeric token with the alphanumeric values.

10. The non-transitory computer-readable medium of claim 7, the operations further comprising:
hashing the numeric user information and a secret key to output the hashed numeric user information; and
encrypting the hashed numeric user information to output the numeric values.

11. The non-transitory computer-readable medium of claim 10, wherein the generating the shuffled numeric user information comprises shuffling the numeric user information through the plurality of randomly generated numeric tables, wherein each numeric character of the numeric user information is shuffled through a different numeric table of the plurality of randomly generated numeric tables identified for the numeric character based on the table index.

12. The non-transitory computer-readable medium of claim 7, the operations further comprising sending the alphanumeric token to at least one of a user device associated with the numeric user information, a storage medium, or an application to facilitate access to a resource.

13. A system comprising:
a memory; and
at least one processor coupled to the memory and configured to perform operations comprising:
determining alphanumeric values based on numeric values that are generated from a hash of numeric user information then shuffled through a plurality of randomly generated alphanumeric tables;
generating a table index based on at least a portion of the numeric user information and the alphanumeric values;
generating shuffled numeric user information based on the table index and a plurality of randomly generated numeric tables;
transforming the shuffled numeric user information to alphanumeric user information based on additive cipher information being applied to the shuffled numeric user information;
shuffling each character of the alphanumeric user information through a different alphanumeric table of the plurality of randomly generated alphanumeric tables, wherein each different alphanumeric table is identified for each character based on the table index;
generating an alphanumeric token based on the shuffled characters of the alphanumeric user information;
determining a numeric value indicative of an amount of numeric characters of the numeric user information; and
modifying the generated alphanumeric token to include an alphabetic value, wherein the alphabetic value is determined based on an alphabetic representation of the numeric value that is shuffled through a plurality of randomly generated alphabetic tables.

14. The system of claim 13, the operations further comprising padding, based on an indication that a numeric character of the numeric user information is removed according to the numeric user information being shuffled through the plurality of randomly generated numeric tables, the alphanumeric token with a randomly generated numeric character.

15. The system of claim 13, the operations further comprising padding the alphanumeric token with the alphanumeric values.

16. The system of claim 13, the operations further comprising:
hashing the numeric user information and a secret key to output the hashed numeric user information; and
encrypting the hashed numeric user information to output the numeric values.

17. The system of claim 16, wherein the generating the shuffled numeric user information comprises shuffling the numeric user information through the plurality of randomly generated numeric tables, wherein each numeric character of the numeric user information is shuffled through a different numeric table of the plurality of randomly generated numeric tables identified for the numeric character based on the table index.

* * * * *